US 8,834,199 B2

(12) United States Patent
Foung et al.

(10) Patent No.: US 8,834,199 B2
(45) Date of Patent: Sep. 16, 2014

(54) TILTED MODULE FOR ASSEMBLING NETWORK DISTRIBUTION DEVICE

(75) Inventors: Paul Foung, Dayton, NJ (US); Yi-Chin Lee, Taipei (TW); Wen-Tsung Tsao, Dayton, NJ (US)

(73) Assignees: Hsing Chau Industrial Co., Ltd. (TW); Archtech Electronics Corporation, Dayton, NJ (US)

( * ) Notice: Subject to any disclaimer, the term of this patent is extended or adjusted under 35 U.S.C. 154(b) by 624 days.

(21) Appl. No.: 13/083,688

(22) Filed: Apr. 11, 2011

(65) Prior Publication Data

US 2012/0256058 A1 Oct. 11, 2012

(51) Int. Cl.
*H01R 13/518* (2006.01)
*H04Q 1/02* (2006.01)
(52) U.S. Cl.
CPC .......... *H01R 13/518* (2013.01); *H01R 2201/04* (2013.01); *H04Q 1/13* (2013.01)
USPC ...................................................... 439/540.1
(58) Field of Classification Search
USPC ............................................. 439/540.1, 719
See application file for complete search history.

(56) References Cited

U.S. PATENT DOCUMENTS

| 4,747,020 | A  | * | 5/1988  | Brickley et al. | 361/827   |
|-----------|----|---|---------|-----------------|-----------|
| 5,734,776 | A  | * | 3/1998  | Puetz           | 385/134   |
| 6,866,541 | B2 | * | 3/2005  | Barker et al.   | 439/540.1 |
| 6,918,786 | B2 | * | 7/2005  | Barker et al.   | 439/540.1 |
| 6,971,909 | B2 | * | 12/2005 | Levesque et al. | 439/540.1 |
| 7,094,095 | B1 | * | 8/2006  | Caveney         | 439/540.1 |
| 7,300,308 | B2 | * | 11/2007 | Laursen et al.  | 439/540.1 |
| 7,591,687 | B2 | * | 9/2009  | Caveney         | 439/676   |
| 7,607,938 | B2 | * | 10/2009 | Clark et al.    | 439/540.1 |
| 7,637,773 | B2 | * | 12/2009 | Shifris et al.  | 439/540.1 |
| 7,811,122 | B2 | * | 10/2010 | Clark et al.    | 439/534   |
| 7,875,799 | B2 | * | 1/2011  | Fransen et al.  | 174/66    |
| 2011/0159726 | A1 | * | 6/2011 | Wang          | 439/540.1 |

* cited by examiner

*Primary Examiner* — Briggitte R Hammond
(74) *Attorney, Agent, or Firm* — Schmeiser, Olsen & Watts, LLP

(57) ABSTRACT

A tilted module adapted to assemble a network distribution device and disposed between a frame and at least a panel of the network distribution device, characterized in that the tilted module having a casing adapted to allow a protruding portion to be disposed at a front of the casing of the tilted module and extend toward two ends thereof to form two tilted surfaces positioned proximate thereto, respectively, the tilted surfaces each having a wall disposed thereon and adapted to engage with the panels, wherein a plurality of fixing elements each extend backward from the casing to engage with the frame, such that the casing is mounted on the frame, thereby allowing the network distribution device thus assembled to facilitate wiring management and saves layout space.

8 Claims, 4 Drawing Sheets

TILTED MODULE FOR ASSEMBLING NETWORK DISTRIBUTION DEVICE

FIELD OF TECHNOLOGY

The present invention relates to auxiliary devices for use with network distribution devices, and more particularly, to a tilted module for assembling a network distribution device.

BACKGROUND

Distribution and follow-up wiring maintenance of a network communication system are of vital importance to the communication quality of the network in its entirety.

Distribution frames for distributing a large amount of wiring are always disposed in a machine room of a network communication system. The distribution frames are always arranged on a plane. As a result, with the distribution frames being fully occupied by the wiring, the intricate arrangement of the wiring has an adverse effect on distribution and maintenance to thereby compromise the operation efficiency, not to mention that the disordered wiring can even compromise the communication quality.

SUMMARY

It is an objective of the present invention to provide a tilted module for assembling a network distribution device such that the network distribution device thus assembled facilitates wiring management and saves layout space.

Another objective of the present invention is to provide a tilted module features a simple mounting structure and thus can be directly mounted on the original frame, thereby dispensing with a new additional custom-made distribution frame.

In order to achieve the above and other objectives, the present invention provides a tilted module disposed between a frame and at least a panel of a network distribution device, characterized in that: the tilted module having a casing adapted to allow a protruding portion to be disposed at a front of the casing of the tilted module and extend toward two ends thereof to form two tilted surfaces positioned proximate thereto, respectively, the tilted surfaces each having a wall disposed thereon and adapted to engage with the panels, wherein a plurality of fixing elements each extend backward from the casing to engage with the frame, such that the casing is mounted on the frame.

In an embodiment of the present invention, a plurality of hook portions are disposed at ends of the fixing elements, respectively, and adapted to engage with the frame, wherein a plurality of gaps are disposed at the hook portions, respectively, and adapted to engage with the frame so as to enhance engagement between the frame and the fixing elements.

In an embodiment of the present invention, two hook portions are disposed at ends of the fixing elements, respectively, and adapted to engage with the frame, wherein two gaps are disposed at the hook portions, respectively, and adapted to engage with the frame so as to enhance engagement between the frame and the fixing elements. A recess is opened at the end of each of the fixing elements extending from the tilted surfaces and disposed between two said hook portions, wherein a slit is disposed on a side of each of two said hook portions, and the slit-disposed side of each of two said hook portions is positioned distal to the recess.

In an embodiment of the present invention, the casing comprises a first casing member and a second casing member, wherein the fixing elements are disposed at opposing ends of the first and second casing members and adapted to couple together the first and second casing members, wherein two paired said hook portions and two paired said gaps are disposed at the ends of the fixing elements disposed at the opposing ends of the first and second casing members, respectively. Slits are opened at the ends of the fixing elements, respectively, and disposed one a side of each of two paired said hook portions to extend toward the tilted surfaces. Complementary gaps are disposed at the fixing elements for coupling together the first casing member and the second casing member and arranged to extend linearly in a front-to-rear direction and positioned between two said hook portions of the fixing elements, respectively, wherein the complementary gaps each comprise a crest and a trough adjacent thereto.

In an embodiment of the present invention, the fixing elements extending from the tilted surfaces are substantially perpendicular to the tilted surfaces. The fixing elements extending from the tilted surfaces are engaged with a grate of the frame.

In an embodiment of the present invention, the protruding portion is centrally disposed at a front of the casing.

Accordingly, a tilted module of the present invention enables a distribution panel which might otherwise be positioned on a plane to extend to different planes in a three-dimensional manner, to thereby provide more space for tidying up the wiring and even further provide extra space for accommodating more wiring with a view to making good use of the space in a machine room.

BRIEF DESCRIPTION OF THE DRAWINGS

To enable persons skilled in the art to fully understand the objectives, features, and advantages of the present invention, the present invention is hereunder illustrated with specific embodiments in conjunction with the accompanying drawings, in which.

DETAILED DESCRIPTION

A tilted module of the present invention functions as an intermediate interface between a conventional distribution frame and a distribution panel to enable the distribution panel to extend to different spatial planes. The tilted module of the present invention has a simple mounting structure for effectuating the extension purpose. A grate is disposed on the tilted module, engaged with the distribution panel, and designed to meet different requirements of the distribution panel, such as a modular distribution panel or a front-accessible distribution panel. Hence, the design of the grate is subject to changes, depending on the requirements of the distribution panel; in other words, the adaptive changes in the design of the grate fall within the scope of disclosure in the present invention.

Figure 1:
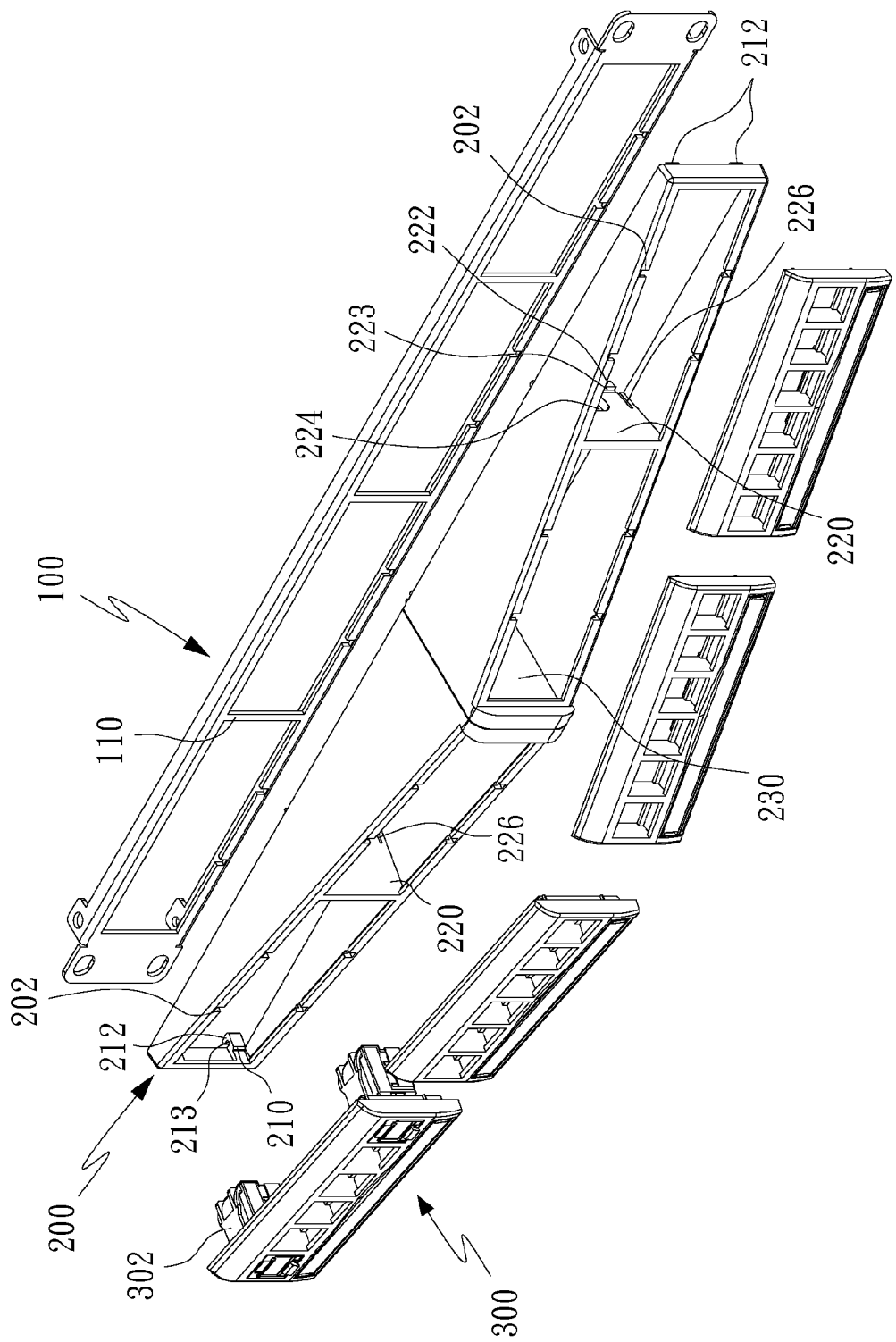
FIG. 1 is an exploded front view of a network distribution device according to an embodiment of the present invention.
Figure 2:
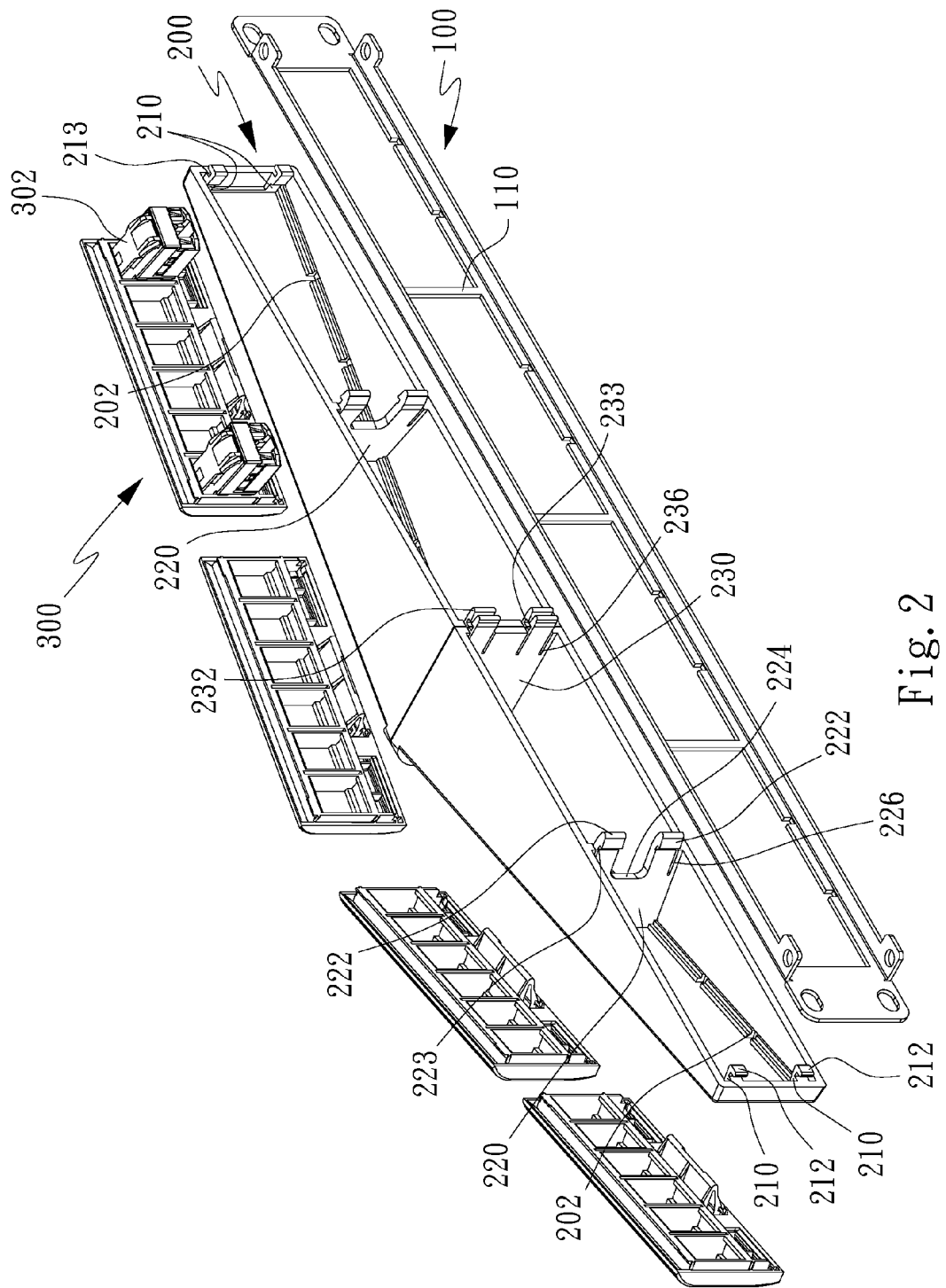
FIG. 2 is an exploded rear view of a network distribution device according to an embodiment of the present invention.

Referring to FIG. 1, there is shown an exploded front view of a network distribution device according to an embodiment of the present invention. Referring to FIG. 2, there is shown an exploded rear view of a network distribution device according to an embodiment of the present invention. Referring to FIG.

3, there is shown an assembled schematic view of a network distribution device according to an embodiment of the present invention.

A network distribution device essentially comprises a distribution frame 100, a casing 200 of a tilted module, and a distribution panel 300. As shown in the drawings, a tilted module for assembling a network distribution device according to the present invention has a distinct improvement over the prior art, that is, the distribution panels 300 are disposed on different planes instead of the same plane, which results from the difference between mounting the distribution panels 300 on the distribution frame 100 and mounting the distribution panels 300 on a wall 202 of the casing 200.

Figure 3:
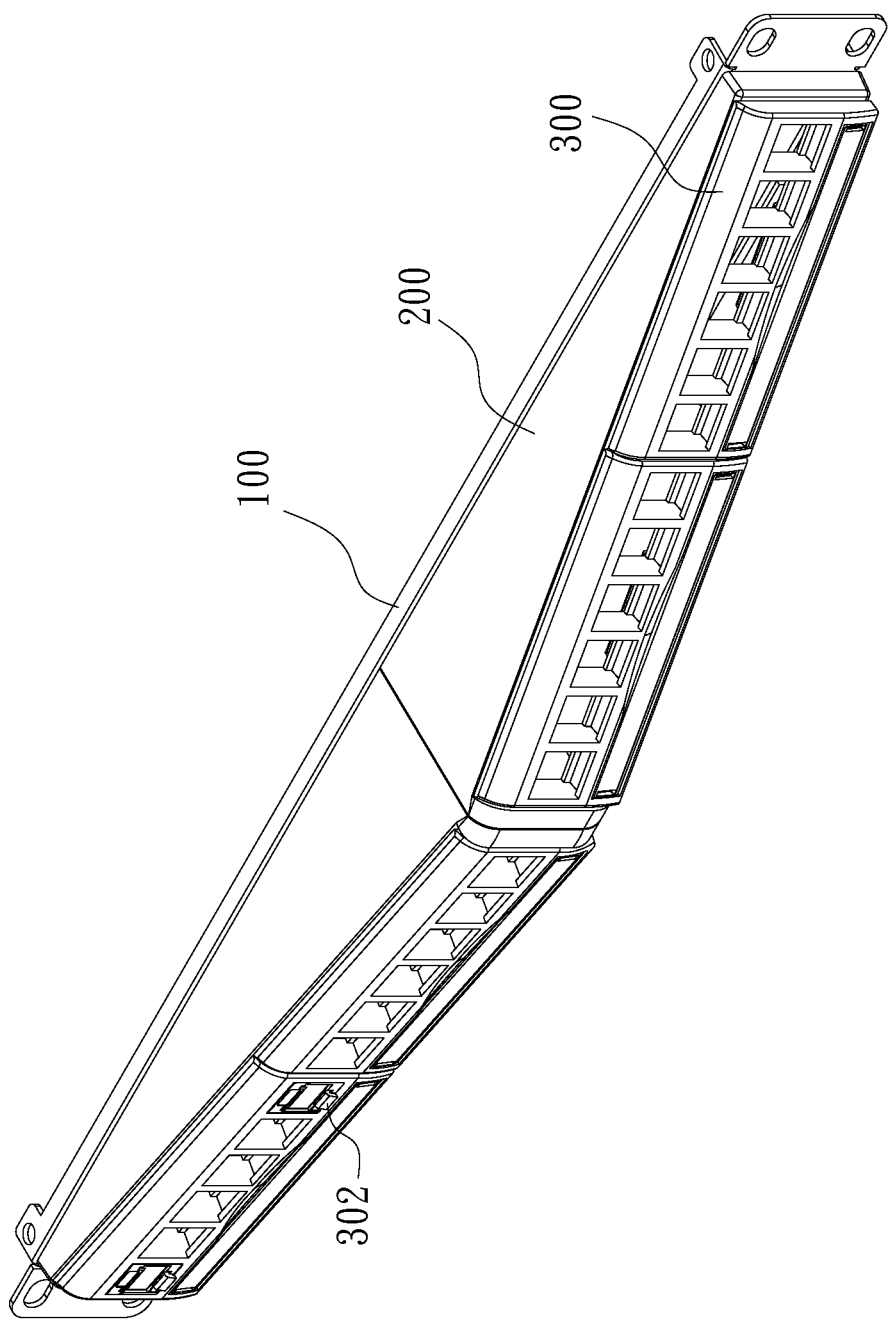
FIG. 3 is an assembled schematic view of a network distribution device according to an embodiment of the present invention.

A protruding portion is disposed at the front of the casing 200 of the tilted module and extends toward two ends thereof to form two tilted surfaces positioned proximate thereto, respectively. The wall 202 is disposed on each of the tilted surfaces and adapted to engage with the distribution panels 300. As shown in FIG. 3, due to the arrangement of the tilted surfaces, the total area of the tilted surfaces is larger than that of the distribution plane of the distribution frame 100, thereby providing more space for tidying up the wiring, and even allowing a plurality of connecting bases 302 to be disposed on the distribution panels 300, respectively, to enhance the ease of tidying up the wiring and make good use of space. As shown in the drawings, the protruding portion is disposed, preferably centrally, at the front of the casing 200 to ensure the bilateral symmetry thereof.

A plurality of fixing elements 210, 220, 230 extend backward from the casing 20. An embodiment of the present invention is exemplified by five said fixing elements. Persons skilled in the art should understand that, in an embodiment of the present invention, the network distribution device can have only two said distribution panels 300 as required to meet a requirement for a distribution environment and, to this end, only three said fixing elements are required. Alternatively, there can be at least four said distribution panels 300 and thereby more than five said fixing elements.

As shown in FIG. 2, with the fixing elements 210, 220, 230 being engaged with a plurality of grates 110 of the distribution frame 100, the casing 200 can be coupled to the distribution frame 100 and thereby mounted thereon.

The fixing elements 210, 220, 230, which serve to enable the casing 200 to be coupled to the distribution frame 100 as described above, are either stationary (by gluing) or movable (by engaging or coupling) in order to serve the aforesaid purpose.

An embodiment of the present invention is implemented, preferably in the aforesaid engaging manner. As shown in FIGS. 1, 2, in an embodiment, a plurality of hook portions 212, 222, 232 are disposed at the ends of the fixing elements 210, 220, 230, respectively. The hook portions 212, 222, 232 are arranged in pairs and adapted to engage with the distribution frame 100 so as to enhance the engagement between the casing 200 and the distribution frame 100. A plurality of gaps 213, 223, 233 are disposed at the hook portions 212, 222, 232, respectively, and adapted to engage with the distribution frame 100 so as to enhance the engagement between the distribution frame 100 and the fixing elements 210, 220, 230. For example, the gap 223 abuts against a corresponding one of the grates 110 of the distribution frame 100.

The fixing elements 220 extending from the tilted surfaces of the casing 200 are substantially perpendicular to the tilted surfaces to thereby increase the utilization of space within the casing 200 and allow more said connecting bases 302 to be installed.

As shown in FIG. 2, a recess 224 is opened at the end of each of the fixing elements 220 extending from the tilted surfaces of the casing 200 and disposed between two said hook portions 222. A slit 226 is disposed on a side of each of the hook portions 222 to extend toward the tilted surfaces, and the slit-disposed side of each of the hook portions is positioned distal to the recess 224, so as to enhance the resilience of the hook portions 222 and facilitate the engagement or coupling of the casing 200 and the distribution frame 100. Referring to FIG. 2, four said hook portions 232 are disposed at the ends of the fixing element 230 centrally disposed at the casing 200, respectively, and the four said hook portions 232 are divided into two groups, and each group of the hook portions 232 has the paired hook portions 232 and the paired gaps 233.

Figure 4:
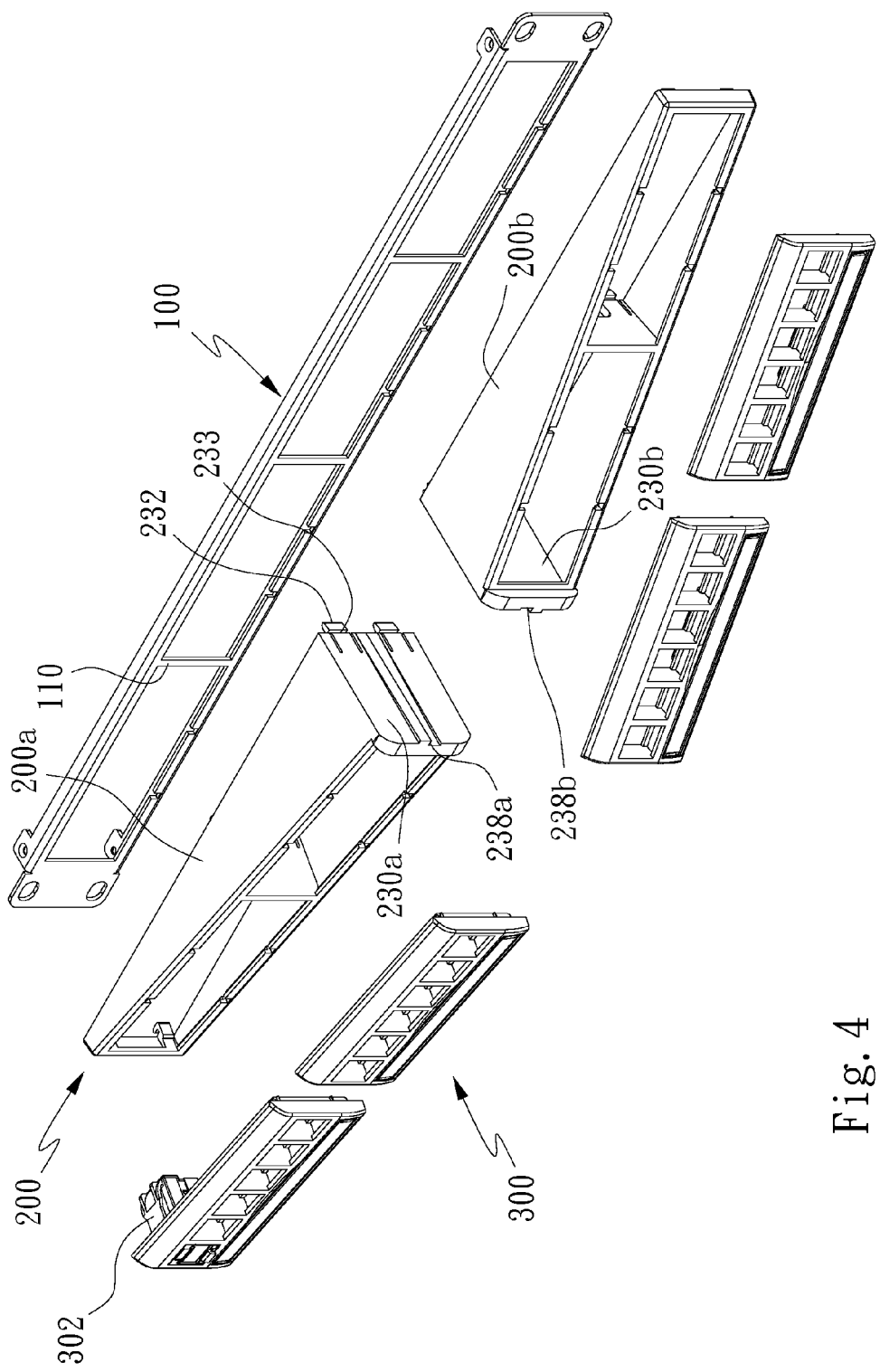
FIG. 4 is an exploded front view of a network distribution device according to another embodiment of the present invention.

Referring to FIG. 4, there is shown an exploded front view of a network distribution device according to another embodiment of the present invention. As shown in the drawing, the casing 200 comprise a first casing member 200a and a second casing member 200b. Two fixing elements 230a, 230b are disposed at the opposing bigger ends of the first and second casing members 200a, 200b, respectively, and adapted to couple together the first and second casing members 200a, 200b. Two said hook portions extend from the end of each of the fixing elements 230a, 230b to form four said hook portions 232. Two paired said hook portions 232 and two paired said gaps 233 (see FIG. 2 as well) are disposed at the end of each of two said fixing elements 230a, 230b. The first and second casing members 200a, 200b are coupled together by means of complementary gaps or any other equivalent coupling means or engaging means. As shown in FIG. 4, the first and second casing members 200a, 200b are coupled together by means of complementary coupling portions 238a, 238b disposed at the two fixing elements 230a, 230b disposed at the opposing bigger ends of the first and second casing members 200a, 200b, respectively, and arranged to extend linearly in a front-to-rear direction and positioned between two said hook portions 232. The complementary coupling portions 238a, 238b each comprise a crest and a trough adjacent thereto. The pairing of the crest and trough of the complementary coupling portion 238a is the mirror image of the pairing of the crest and trough of the complementary coupling portion 238b, so as for the first and second casing members 200a, 200b to be coupled together.

Likewise, to facilitate the engagement or coupling of the casing 200 and the distribution frame 100, a slit 236 is disposed on a side of each of four said hook portions 232, and the slit-disposed side of each of four said hook portions 232 is positioned distal to the recess 224. The slits 236 are opened at the ends of the fixing elements 220, 230, respectively, to extend toward the tilted surfaces.

In conclusion, a tilted module of the present invention enables a distribution panel which might otherwise be positioned on a plane to extend to different planes in a three-dimensional manner, to thereby provide more space for tidying up the wiring and even further provide extra space for accommodating more wiring with a view to making good use of the space in a machine room.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A tilted module adapted to assemble a network distribution device and disposed between a frame and at least a panel of the network distribution device, wherein the frame of the network distribution device has a plurality of walls for engaging with the panel of the network distribution device, the tilted module comprising:

a casing adapted to allow a protruding portion to be disposed at a front of the casing of the tilted module and extend toward two ends thereof to form two tilted surfaces positioned proximate thereto, respectively;

wherein the two tilted surfaces each have a wall disposed thereon and adapted to engage with the panels, further wherein a plurality of fixing elements each extend backward from the casing to engage with the frame, such that the casing is mounted on the frame;

wherein two hook portions are disposed at ends of the plurality of fixing elements, respectively, and adapted to engage with the frame, wherein two gaps are disposed at the two hook portions, respectively, and adapted to engage with the frame so as to enhance engagement between the frame and the plurality of fixing elements;

wherein a recess is opened at the end of each of the fixing elements extending from the two tilted surfaces and disposed between two said hook portions, wherein a slit is disposed on a side of each of said two hook portions, and the slit-disposed side of each of said two hook portions is positioned distal to the recess.

2. The tilted module of claim 1, wherein a plurality of hook portions are disposed at ends of the fixing elements, respectively, and adapted to engage with the frame, wherein a plurality of gaps are disposed at the hook portions, respectively, and adapted to engage with the frame so as to enhance engagement between the frame and the plurality of fixing elements.

3. The tilted module of claim 1, wherein the protruding portion is centrally disposed at a front of the casing.

4. The tilted module of claim 1, wherein the casing comprises a first casing member and a second casing member, wherein the fixing elements are disposed at opposing ends of the first and second casing members and adapted to couple together the first and second casing members, wherein two paired said hook portions and two paired said gaps are disposed at the ends of the fixing elements disposed at the opposing ends of the first and second casing members, respectively.

5. The tilted module of claim 4, wherein a plurality of slits are opened at the ends of the fixing elements, respectively, and disposed one a side of each of two paired said hook portions to extend toward the tilted surfaces.

6. The tilted module of claim 5, wherein a plurality of complementary gaps are disposed at the fixing elements for coupling together the first casing member and the second casing member and arranged to extend linearly in a front-to-rear direction and positioned between two said hook portions of the fixing elements, respectively, wherein the complementary gaps each comprise a crest and a trough adjacent thereto.

7. The tilted module of claim 1, wherein the plurality of fixing elements extending from the tilted surfaces are substantially perpendicular to the tilted surfaces.

8. The tilted module of claim 7, wherein the plurality of fixing elements extending from the tilted surfaces are engaged with a grate of the frame.

* * * * *